(12) United States Patent
Vincent

(10) Patent No.: US 8,112,864 B2
(45) Date of Patent: Feb. 14, 2012

(54) EXTRACTION DEVICE FOR USE WHEN EXTRACTING A CERAMIC FOAM FILTER

(75) Inventor: Mark Vincent, Leighton Buzzard (GB)

(73) Assignee: Pyrotek, Inc., Spokane, WA (US)

( * ) Notice: Subject to any disclaimer, the term of this patent is extended or adjusted under 35 U.S.C. 154(b) by 912 days.

(21) Appl. No.: 11/995,472

(22) PCT Filed: Jun. 19, 2006

(86) PCT No.: PCT/GB2006/002232
§ 371 (c)(1),
(2), (4) Date: Jun. 16, 2008

(87) PCT Pub. No.: WO2007/012795
PCT Pub. Date: Feb. 1, 2007

(65) Prior Publication Data
US 2008/0313876 A1 Dec. 25, 2008

(30) Foreign Application Priority Data
Jul. 23, 2005 (GB) .................................. 0515153.5

(51) Int. Cl.
*B23P 19/00* (2006.01)
*B23P 19/04* (2006.01)
(52) U.S. Cl. ........................................ 29/426.1; 29/240
(58) Field of Classification Search ................. 29/426.1, 29/426.5, 426.3, 721, 700, 235, 240.5, 240, 29/283.5; 81/53.2
See application file for complete search history.

(56) References Cited

U.S. PATENT DOCUMENTS

| | | |
|---|---|---|
| 330,974 A | 11/1885 | Friedmann et al. |
| 2,504,978 A | 4/1950 | Henning |
| 2,577,333 A | 12/1951 | Klum |
| 3,207,242 A | 9/1965 | Miller |
| 3,318,182 A | 5/1967 | Carlson |
| 3,654,690 A | 4/1972 | Hardin |
| 4,504,392 A | 3/1985 | Groteke |
| 4,688,315 A | 8/1987 | Jannke |
| D294,584 S | 3/1988 | Pedersen |
| 4,753,562 A | 6/1988 | Hirayoshi |
| 4,892,429 A | 1/1990 | Giannuzzi |
| 5,358,209 A | 10/1994 | Ward |
| 5,408,788 A | 4/1995 | Hamilton et al. |
| 5,575,122 A | 11/1996 | Hamilton et al. |
| 5,607,261 A | 3/1997 | Odom et al. |

(Continued)

FOREIGN PATENT DOCUMENTS
DE 197 21 766 A1 5/1997

(Continued)

OTHER PUBLICATIONS

International Search Report for PCT Application No. PCT/GB2006/002232, date of mailing Dec. 1, 2006.

(Continued)

*Primary Examiner* — John C Hong
(74) *Attorney, Agent, or Firm* — Knobbe Martens Olson & Bear, LLP

(57) ABSTRACT

An extraction device is provided for use when extracting a ceramic foam filter, as used for example in the production and processing of aluminum. The extraction device includes an anchor device (1) having an anchor body (2) suitable for driving into the filter, and a screw thread (8) that extends along at least part of the length of the anchor body, for engagement with the filter.

19 Claims, 9 Drawing Sheets

U.S. PATENT DOCUMENTS

| | | |
|---|---|---|
| 5,718,153 A | 2/1998 | Borden |
| 5,794,727 A | 8/1998 | Murray |
| D398,363 S | 9/1998 | Lobue |
| 5,820,319 A | 10/1998 | Hull et al. |
| D421,532 S | 3/2000 | Koroncai |
| 6,032,880 A | 3/2000 | Verrills et al. |
| 6,168,101 B1 | 1/2001 | Xie |
| 6,321,861 B1 | 11/2001 | Leichter |
| 6,412,235 B1 | 7/2002 | Pylant |
| 6,817,810 B2 | 11/2004 | Jones |
| D518,286 S | 4/2006 | Santos |
| D546,167 S | 7/2007 | Noethe |
| D549,088 S | 8/2007 | Gallien |
| 7,309,198 B1 | 12/2007 | Brown |
| D594,041 S | 6/2009 | Lin |
| 2004/0154814 A1 | 8/2004 | Brennan |
| 2008/0019792 A1 | 1/2008 | Ernst et al. |

FOREIGN PATENT DOCUMENTS

| | | |
|---|---|---|
| DE | 202005005708 U | 8/2005 |
| EP | 0927568 A1 | 7/1999 |
| GB | 593548 A | 10/1947 |
| GB | 2330107 A | 4/1999 |
| GB | 2359039 A | 8/2001 |
| GB | 2380236 A | 4/2003 |
| GB | 2 428 619 A | 2/2007 |

OTHER PUBLICATIONS

International Search Report for GB Application No. GB0719981.3, date of search Feb. 13, 2008.

International Search Report for GB Application No. GB0515153.5, date of search Oct. 19, 2005.

EXTRACTION DEVICE FOR USE WHEN EXTRACTING A CERAMIC FOAM FILTER

The present invention relates to an extraction device for use when extracting a ceramic foam filter, as used for example in the production and processing of aluminium and other metals.

Molten aluminium usually has to be filtered before it is cast. The filtration process removes particles that could otherwise cause rejects in the final products.

Traditionally, ceramic foam filters are used. These are made from alumina refractory slurry by impregnating a reticulated foam manufactured to a specific porosity with the slurry. The impregnated foam is then dried and fired in a kiln. The foam burns off leaving a porous ceramic body, which is used as the filter. Ceramic filters come in various sizes, typically 7", 9", 12", 15", 17", 20", 23" and 26" wide, and 2" thick (16 cm, 20 cm, 27 cm, 34 cm, 38 cm, 45 cm, 52 cm and 58 cm wide, and 5 cm thick).

For use, the filter is mounted in a refractory filter bowl. Liquid aluminium is poured into the bowl through the filter, which traps fine particles in the liquid metal. When the casting operation is complete, the aluminium remaining within the ceramic filter freezes, forming a block of virtually solid aluminium.

After use, the filter must be removed and replaced before the next casting operation. Current industrial practice to remove the filter is to stab a hole in the filter while it is still full of liquid aluminium. The aluminium is then allowed to freeze, after which the filter is pulled out using a hooked steel bar. This is not however a very elegant or safe solution, as liquid metal can splash out when puncturing the filter. The refractory bowl that houses the filter may also be damaged if the steel spike passes through the filter and jabs the base. Broken filter parts can also sometimes get washed into the next cast.

It is an object of the present invention to provide a filter extraction device, and a method of extracting a filter, that mitigates at least some of the aforesaid disadvantages.

According to the present invention there is provided an extraction device for use when extracting a ceramic foam filter, the extraction device including an anchor device suitable for driving into the filter, said anchor device having an anchor body and a screw thread that extends along at least part of the length of the anchor body, for engagement with the filter.

The extraction device may be used to extract a used ceramic foam filter safely and efficiently. Because the filter is not broken violently, there is no significant risk of liquid aluminium being splashed out of the filter or the filter bowl, and very little or no loose debris will be created, so reducing the risk of contaminating a subsequent batch of aluminium. The extraction device locks firmly into the filter, reducing the risk of it being dropped.

Advantageously, the extraction device includes connection means for connecting the extraction device to an insertion/extraction tool. The connection means preferably comprises a screw thread provided at one end of the anchor body. Alternatively, some other kind of connection means may be provided, for example a bayonet connector.

The anchor device preferably includes a cutter element at one end of the anchor body, for cutting a passageway in the filter. The cutter element preferably comprises a blade or a plurality of blades provided at one end of the anchor body. The cutter blade allows the extraction device to be driven into the ceramic foam filter without causing it to crack or break. This also helps to ensure that the screw thread makes a strong connection with the filter material.

Advantageously, the anchor device has an overall length in the range 20-48 mm, preferably approximately 45 mm. This ensures that when the anchor device is inserted into the filter to its full depth, it does not break through the opposite side of the filter, thereby preventing debris from falling into the filter bowl.

Advantageously, the overall diameter of the screw thread is in the range 25-100 mm, preferably approximately 55 mm. The anchor body is preferably cylindrical, having a diameter in the range 13-22 mm, preferably 15 mm. Advantageously, the screw thread comprises from one to eight turns, preferably about two turns. We have found that a screw thread with only a few widely spaced turns provides a much stronger connection with the rather crumbly material of the ceramic foam filter than a thread with more closely spaced turns. Advantageously, the screw thread has a pitch in the range 5-30 mm, preferably 8-20 mm. The radial depth of the screw thread is advantageously between 10 and 35 mm, preferably approximately 20 mm, and the thickness of the screw thread is advantageously between 0.2 and 2.0 mm, preferably approximately 1.0 mm.

Advantageously, the extraction device includes a stop member attached to one end of the anchor device. This prevents the anchor device from being driven too far into the filter.

The extraction device is preferably made from carbon steel. Alternatively, it may be made from stainless steel, aluminium or another suitable material.

According to another aspect of the invention there is provided a method of extracting a ceramic foam filter, the method including screwing an extraction device into the filter, said extraction device including an anchor device having an anchor body and a screw thread that extends along at least part of the length of the anchor body, and lifting the extraction device to extract the filter.

The extraction device is preferably as defined by any one of the preceding statements of invention.

Various embodiments of the invention will now be described by way of example, with reference to the accompanying drawings, in which.

Figure 1:
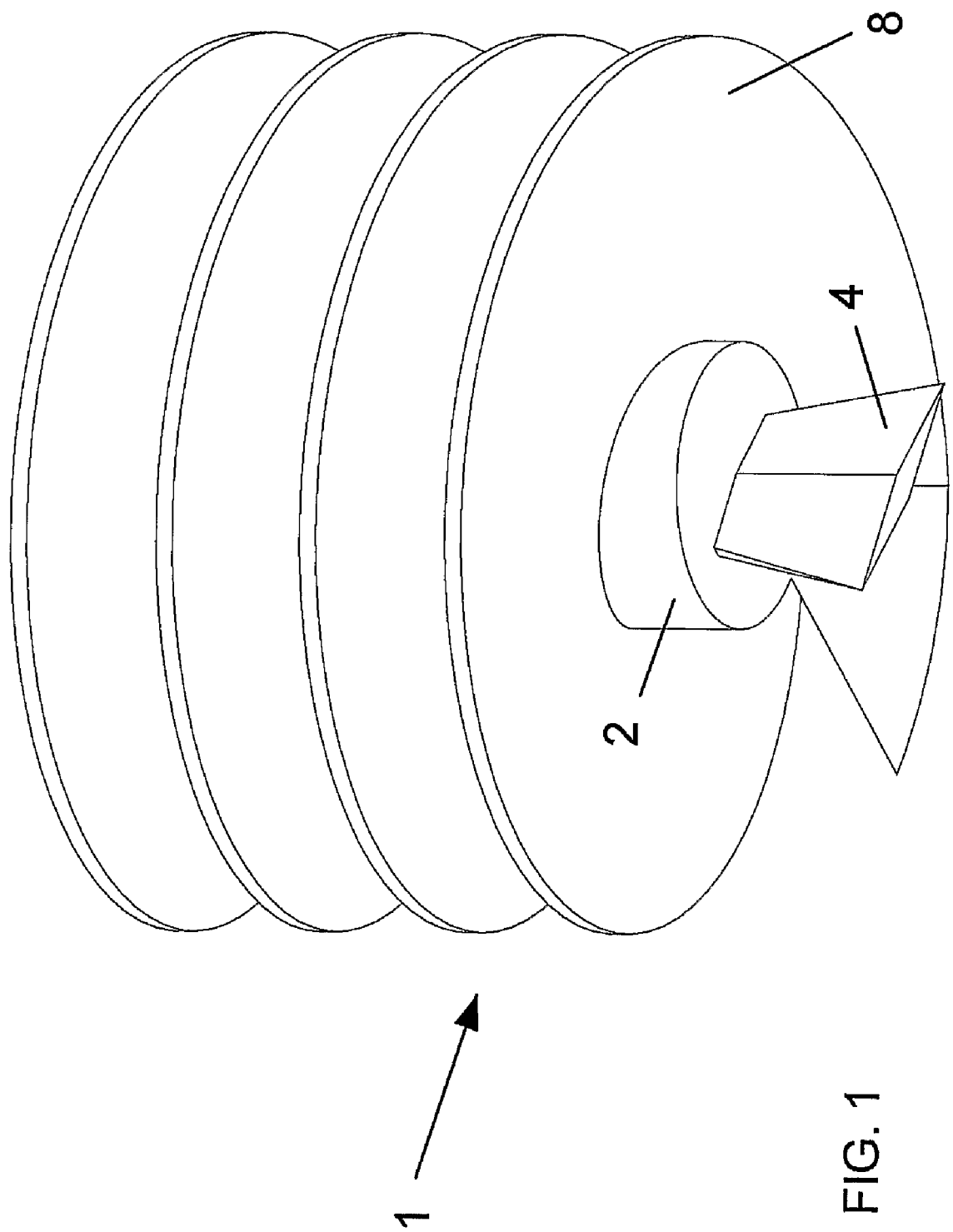
FIG. 1 is an isometric view of a first extraction device according to the invention.
Figure 2:
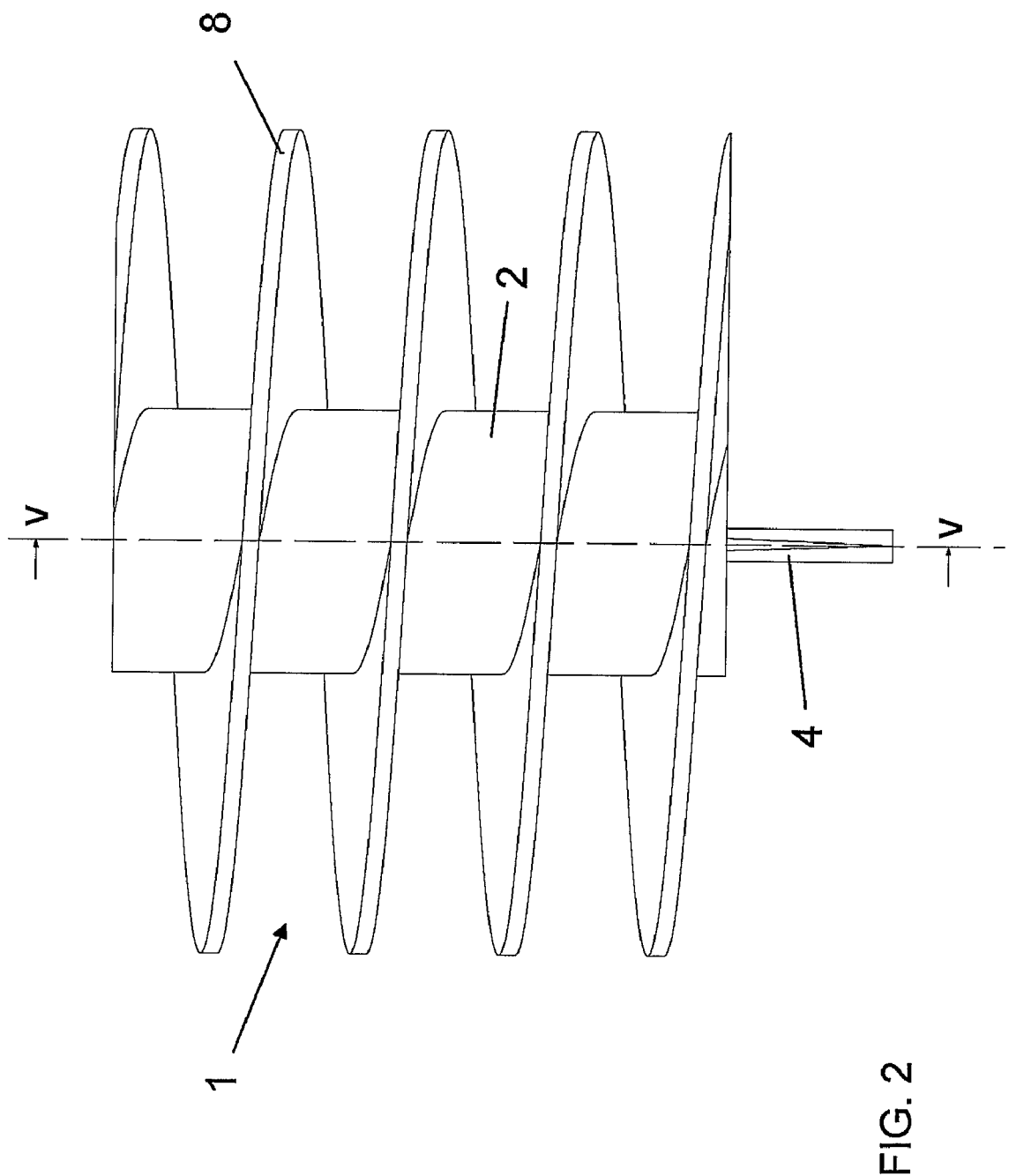
FIG. 2 is a side elevation of the first extraction device.
Figure 3:
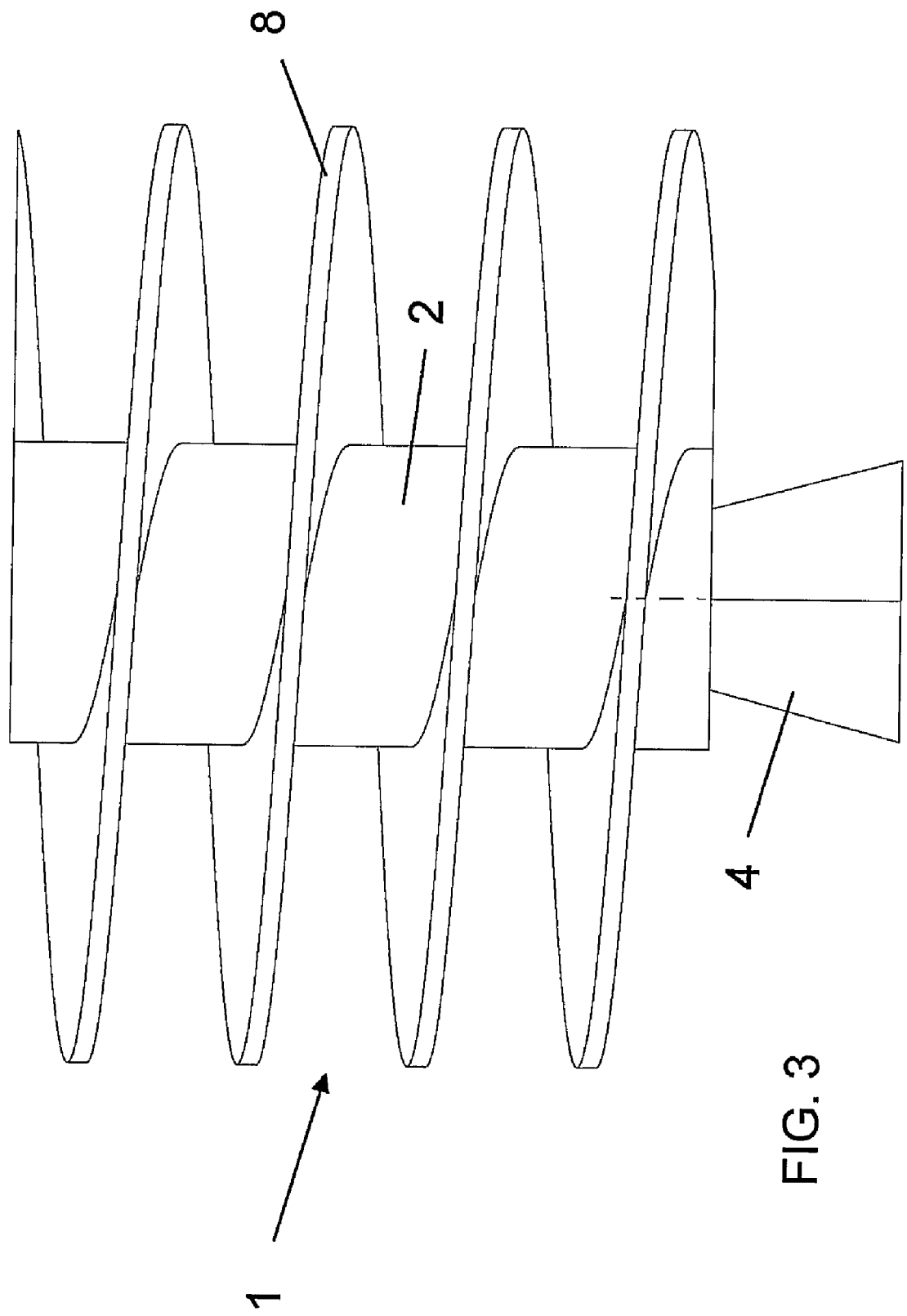
FIG. 3 is a front elevation of the first extraction device.
Figure 4:
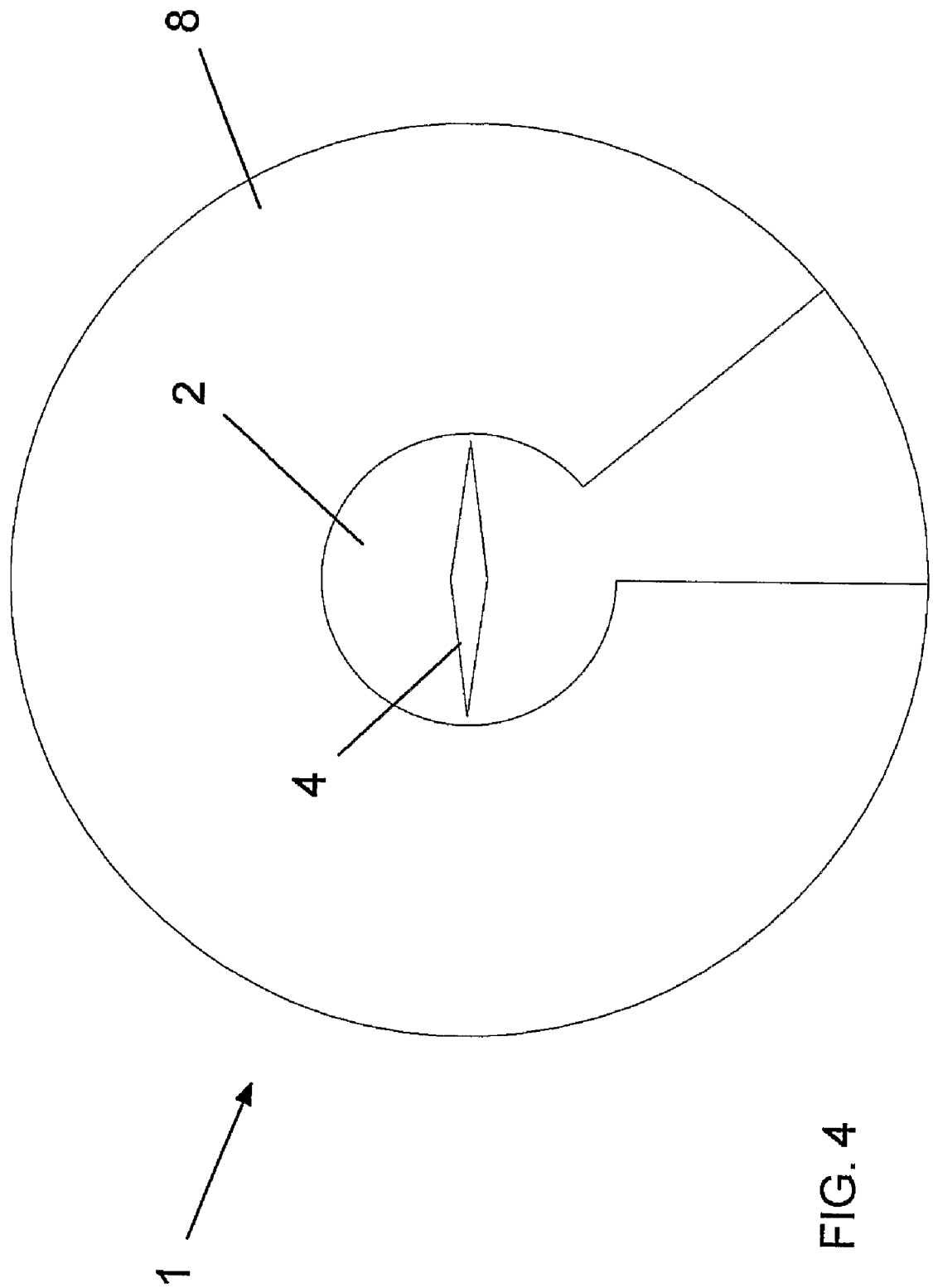
FIG. 4 is an end view of the first extraction device.
Figure 5:
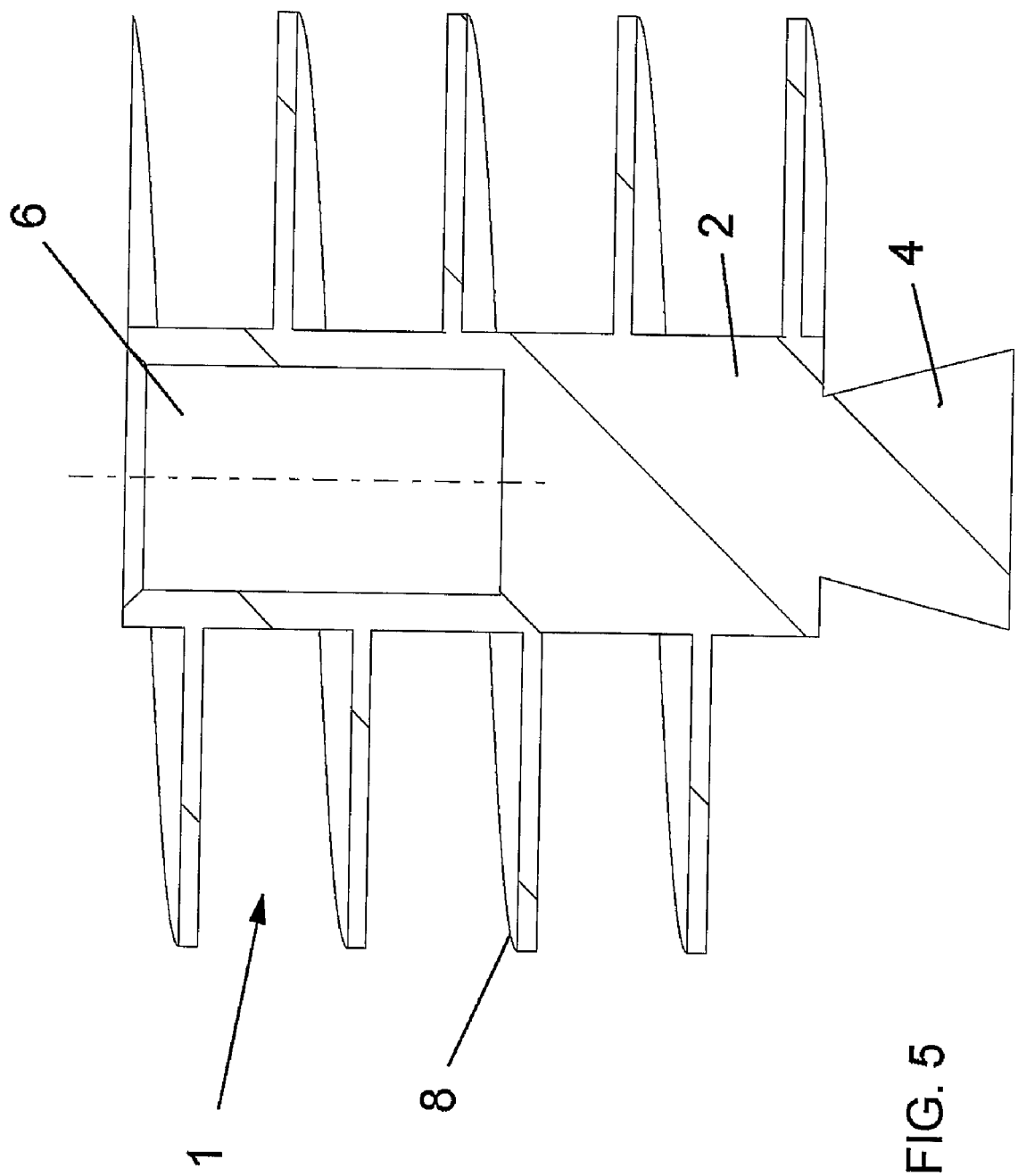
FIG. 5 is a cross-section of the first extraction device on line V-V of FIG. 2.
Figure 6:
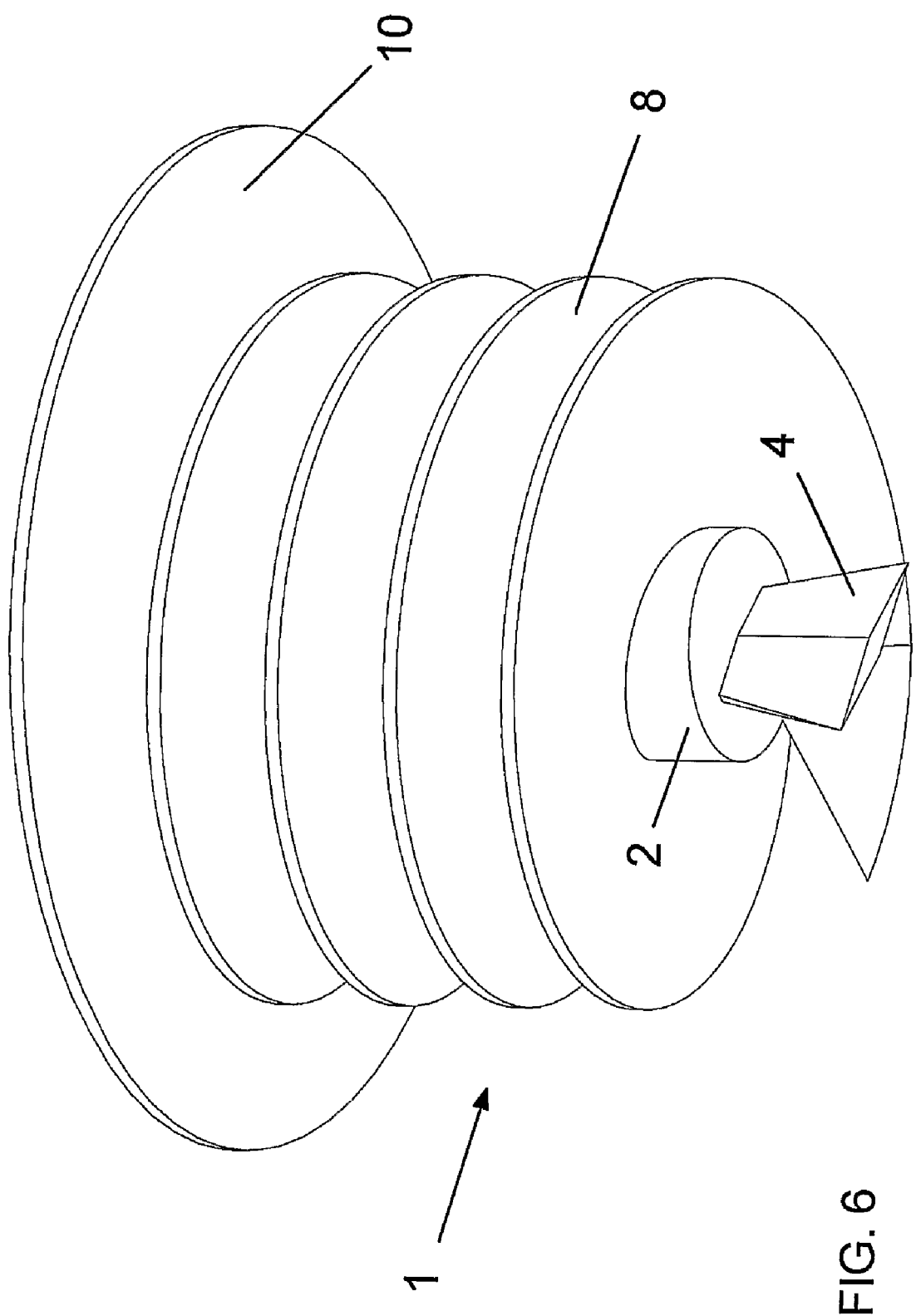
FIG. 6 is an isometric view of a second extraction device according to the invention.
Figure 7:
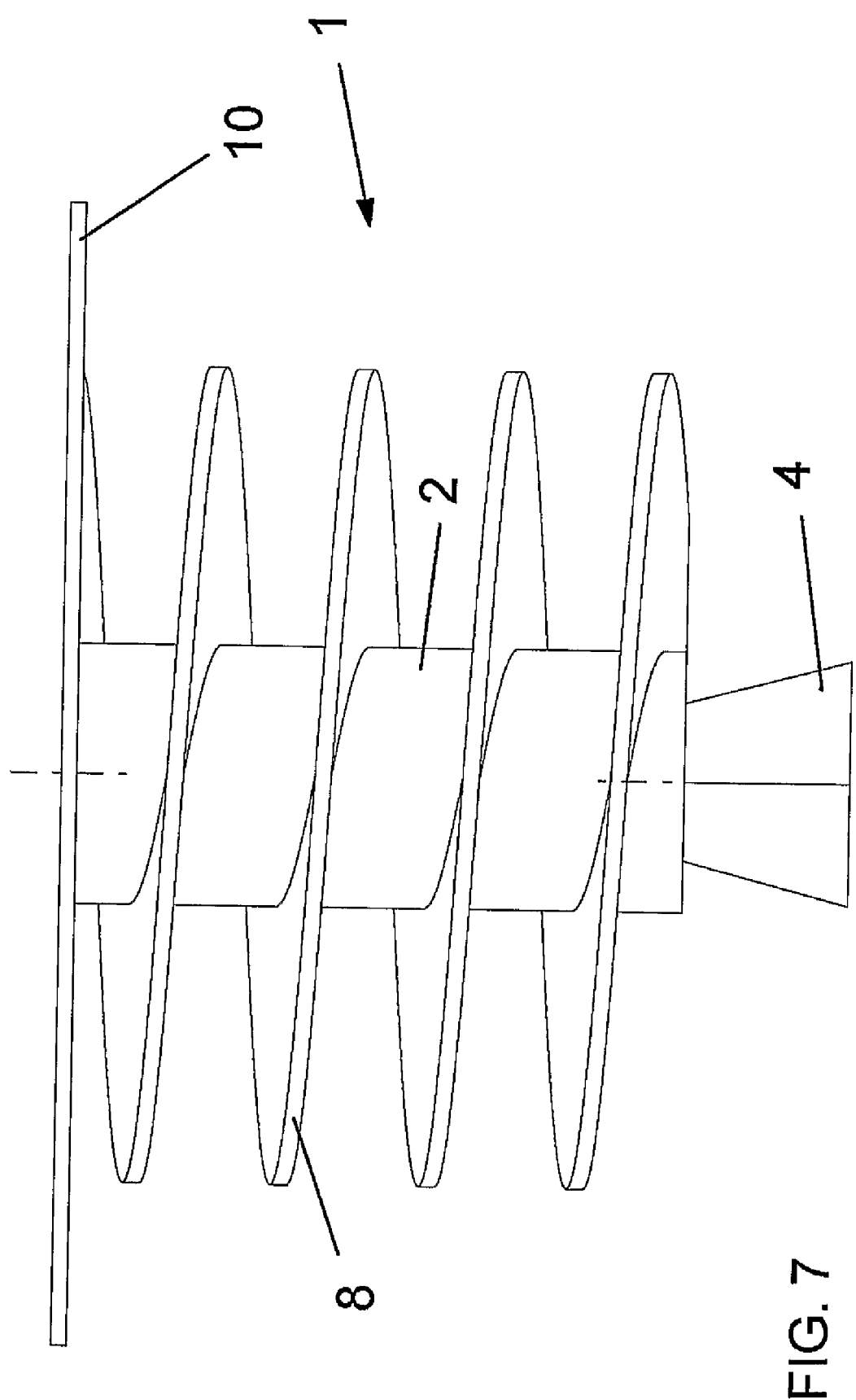
FIG. 7 is a front elevation of the second extraction device.

The first extraction device shown in FIGS. 1-5 includes an anchor device 1 comprising a cylindrical anchor body 2 having a cutter blade 4 at one end of the body and a cylindrical bore 6 at the other end of the body. The outline shape of the cutter blade 4 is a trapezium (US trapezoid) and the leading edge of the blade is sharpened, so that it will cut into a ceramic foam filter. The bore 6 is provided with an internal female screw thread (not shown), forming a connection means for connecting the extraction device to an insertion/extraction tool (not shown). The insertion/extraction tool may for example consist of a T-bar having a screw thread at one end, for engagement with the internal screw thread in the bore 6. The insertion/extraction tool may also include a lifting eye, for connection to a hoist or other lifting device.

An external male helical screw thread 8 extends outwards from the cylindrical surface of the anchor body 2. In the embodiment shown in the drawings, this screw thread extends along the entire length of the anchor body and includes approximately four widely spaced turns. The screw thread has a radial depth of approximately 20 mm, a thickness of about 1 mm and a pitch of about 8.5 mm. The anchor body 2 has a diameter of approximately 15 mm, so that the overall diameter of the extraction device is approximately 55 mm. The anchor device 1 has a length of approximately 45 mm, the anchor body 2 having a length of approximately 35 mm and the blade 4 having a length of approximately 10 mm. The extraction device is made for example of carbon steel.

In use, an insertion/extraction tool is connected to the extraction device, by being screwed into the threaded bore 6 at the upper end of the anchor body 2. Then, while the aluminium within the filter is still in a liquid state, the extraction device is driven into the upper face of the ceramic foam filter by rotating the insertion/extraction tool. As it rotates, the cutter blade 4 cuts a cylindrical hole in the filter, to accommodate the cylindrical anchor body. The screw thread cuts a helical screw into the filter around the bore made by the cutter blade 4, so locking the extraction device into the filter. The extraction device is driven into the filter until the anchor device 1 is embedded to its full depth and the upper end of the anchor body 2 is flush with the top surface of the filter. As the length of the anchor device 1 is slightly less than the thickness of the filter, it will not break through the lower face of the filter, so preventing debris from falling into the filter bowl.

The extraction device is left in the filter until the retained aluminium has solidified: this further increases the mechanical interlock between the extraction device and the filter. The filter is then extracted from the filter bowl by lifting the insertion/extraction tool. The filter can therefore be removed easily and cleanly, without leaving debris in the filter bowl and without giving rise to a risk of liquid aluminium being splashed out of the filter. A new filter can then be placed in the filter bowl so that it is ready for another casting operation.

A second extraction device according to the invention is shown in FIGS. 6-9. This is similar in many respects to the first extraction device described above and similar reference numbers have been used where appropriate.

Where the second extraction device differs from the first extraction device is in the provision of a stop member 10, comprising an annular plate that is attached to the upper end of the anchor body 2. The diameter of the stop member 10 is greater than the diameter of the screw thread 8, so that it extends outwards beyond the outer edge of the screw thread. For example, the stop plate 10 may have a diameter of approximately 75 mm.

The second extraction device is used in the same way as the first extraction device described above. However, when the anchor device 1 has been driven fully into the filter, the stop plate 10 abuts the face of the filter, preventing the anchor device from being driven any further into the filter. This ensures that no part of the anchor device breaks through the lower surface of the filter. Once the anchor device 1 has been driven fully into the filter and the aluminium has solidified, the filter is removed as described previously.

Various modifications of the extraction device are of course possible, for example, the anchor device may have an overall length in the range 20-48 mm and a diameter in the range of 13-22 mm. The screw thread may have been one and eight turns, preferably approximately two turns, with a radial depth of 10-35 mm and a thickness of 0.2-2.0 mm, preferably about 1.0 mm. The anchor body may also take other forms, for example it may be conical or frusto-conical, and the screw thread may also increase in diameter from one end of the anchor body to the other. The extraction device may be made from carbon steel or other suitable materials, for example stainless steel or aluminium.

The invention claimed is:

1. An extraction device for extracting a ceramic foam filter, the extraction device including an anchor device for driving into the filter, said anchor device having an anchor body, an external screw thread that extends along at least part of the length of the anchor body, for engagement with the filter, and a connector comprising a screw thread or a bayonet connector provided at one end of the anchor body for connecting the extraction device to an insertion/extraction tool whereby the device can be driven into the filter by rotating the insertion/extraction tool, and whereby the filter can be extracted by lifting the insertion/extraction tool, wherein the external screw thread has a pitch in the range of 5-30 mm and an overall diameter in the range of 25-100 mm.

2. The extraction device according to claim 1, wherein the connector comprises a screw thread.

3. The extraction device according to claim 1, wherein the anchor device includes a cutter element at one end of the anchor body, for cutting a passageway in the filter.

4. The extraction device according to claim 3, wherein the cutter element comprises a blade or a plurality of blades provided at one end of the anchor body.

5. The extraction device according to claim 1, wherein the anchor device has an overall length in the range of 20-48 mm.

6. The extraction device according to claim 5, wherein the anchor device has an overall length of about 45 mm.

7. The extraction device according to claim 1, wherein the anchor body is cylindrical and has a diameter in the range of 13-22 mm.

8. The extraction device according to claim 7, wherein the anchor body has a diameter of about 15 mm.

9. The extraction device according to claim 1, wherein the screw thread comprises from one to eight turns.

10. The extraction device according to claim 9, wherein the screw thread comprises about 2 turns.

11. The extraction device according to claim 1, wherein the screw thread has a radial depth between 10 mm and 35 mm.

12. The extraction device according to claim 11, wherein the screw thread has a radial depth of about 20 mm.

13. The extraction device according to claim 1, wherein the screw thread has a thickness of between 0.2 mm and 2.0 mm.

14. The extraction device according to claim 13, wherein the screw thread has a thickness of about 1.0 mm.

15. The extraction device according to claim 1, wherein the extraction device includes a stop member attached to one end of the anchor body.

16. The extraction device according to claim 1, wherein the extraction device is made from carbon steel.

17. The extraction device according to claim 1, wherein the overall diameter of the screw thread is about 55 mm.

18. The extraction device according to claim 1, wherein the screw thread has a pitch in the range of 8-20 mm.

19. A method of extracting a ceramic foam filter using an extraction device comprising an anchor device having an anchor body an external screw thread that extends alone at least cart of the length of the anchor body and has a pitch in the range 5-30 mm and an overall diameter in the range 25-100 mm, and a connector comprising a screw thread or a bayonet connector provided at one end of the anchor body, the method including connecting the extraction device to an insertion/extraction tool via the connector, screwing the extraction device into the filter with the insertion/extraction tool, and lifting the extraction device with the insertion/extraction tool to extract the filter.

* * * * *

UNITED STATES PATENT AND TRADEMARK OFFICE
CERTIFICATE OF CORRECTION

| | | |
|---|---|---|
| PATENT NO. | : 8,112,864 B2 | Page 1 of 1 |
| APPLICATION NO. | : 11/995472 | |
| DATED | : February 14, 2012 | |
| INVENTOR(S) | : Mark Vincent | |

It is certified that error appears in the above-identified patent and that said Letters Patent is hereby corrected as shown below:

In Column 1, Line 3, Below "Title" insert –

--RELATED APPLICATIONS
This application is the U.S. National Phase filing under 35 U.S.C. §371 of PCT/GB2006/002232, filed June 19, 2006, which designated the United States and was published in English, which claims priority under 35 U.S.C. §119(a)-(d) to Great Britain Patent Application No. 0515153.5, filed July 23, 2005. The contents of these applications is incorporated herein by reference in their entireties.--.

In Column 1, Line 3, Above the paragraph "The Present invention.................and other metals." insert --Field of the Invention--.

In Column 1, Line 7, Below the paragraph "The Present invention.................and other metals." insert --Background of the Invention--.

In Column 1, Line 39, Below the paragraph "It is an object............aforesaid disadvantages." insert --Summary of the Invention--.

In Column 2, Line 38, Below the paragraph "The extraction device............statements of invention." insert --Brief Description of the Drawings--.

Figure 8:
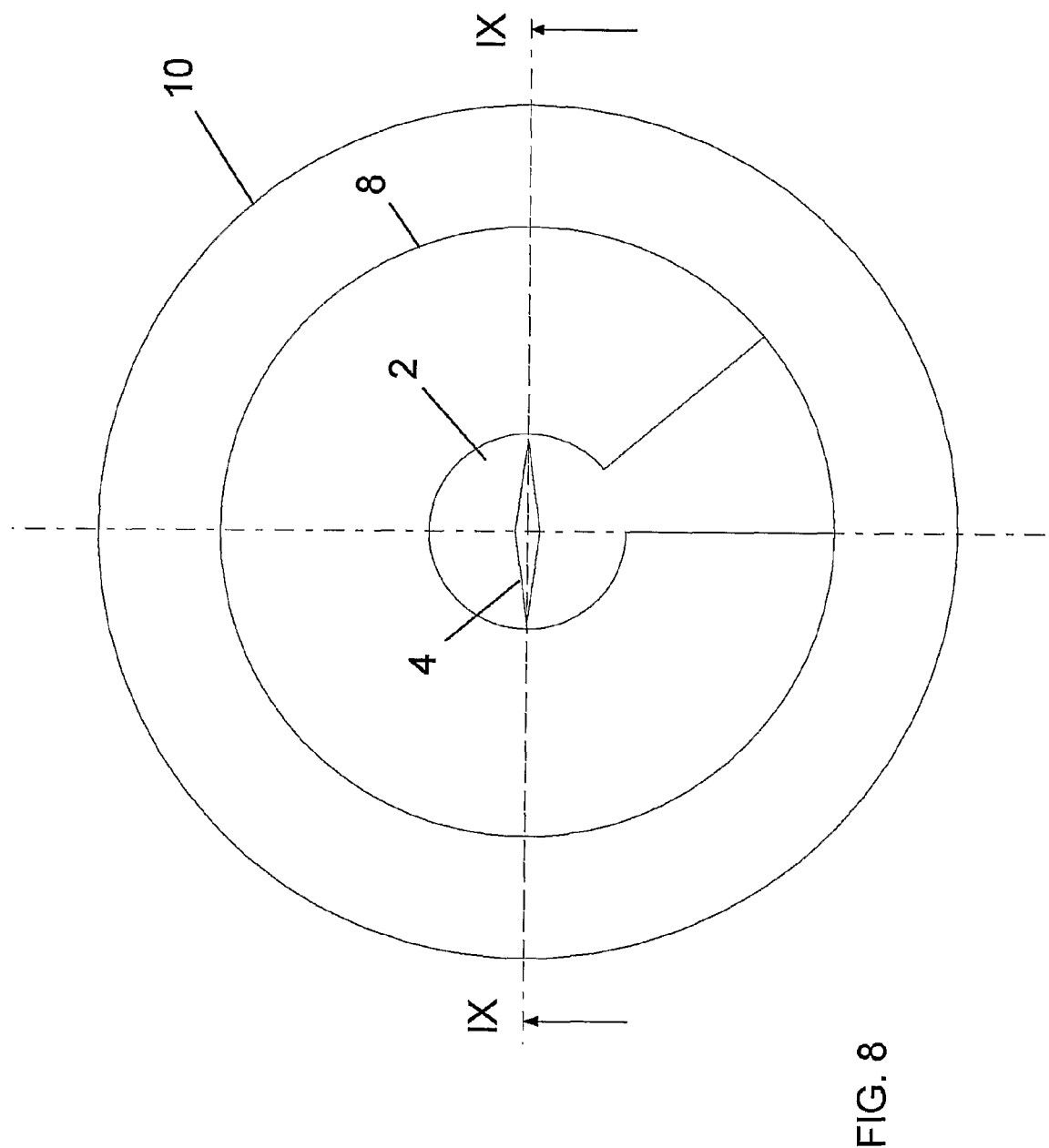
FIG. 8 is an end view of the second extraction device.
Figure 9:
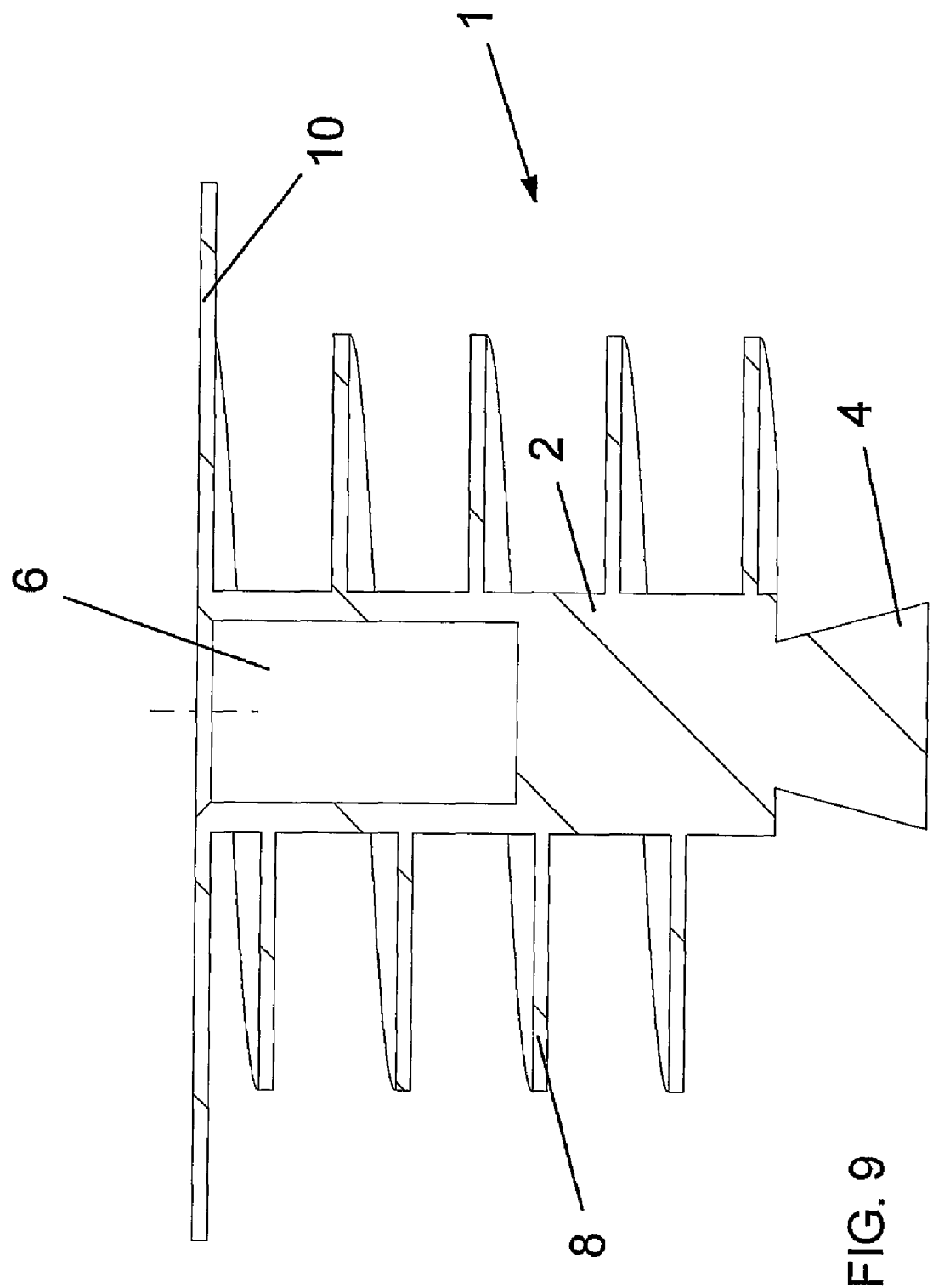
FIG. 9 is a cross-section of the second extraction device, on line IX-IX of FIG. 8.

In Column 2, Line 53, Below the paragraph "FIG. 9 is...........of FIG. 8." insert --Detailed Description of the Preferred Embodiment--.

In Column 4, Line 55, In Claim 19, change "body" to --body,--.

In Column 4, Line 55, In Claim 19, change "alone" to --along--.

In Column 4, Line 56, In Claim 19, change "cart" to --part--.

Signed and Sealed this
Fourth Day of September, 2012

David J. Kappos
*Director of the United States Patent and Trademark Office*